E. GIGLIO.
RECTIFYING APPARATUS FOR ELECTRIC CURRENTS.
APPLICATION FILED APR. 25, 1910. RENEWED DEC. 30, 1911.

1,184,233.

Patented May 23, 1916.
2 SHEETS—SHEET 1.

E. GIGLIO.
RECTIFYING APPARATUS FOR ELECTRIC CURRENTS.
APPLICATION FILED APR. 25, 1910. RENEWED DEC. 30, 1911.
1,184,233.
Patented May 23, 1916.
2 SHEETS—SHEET 2.
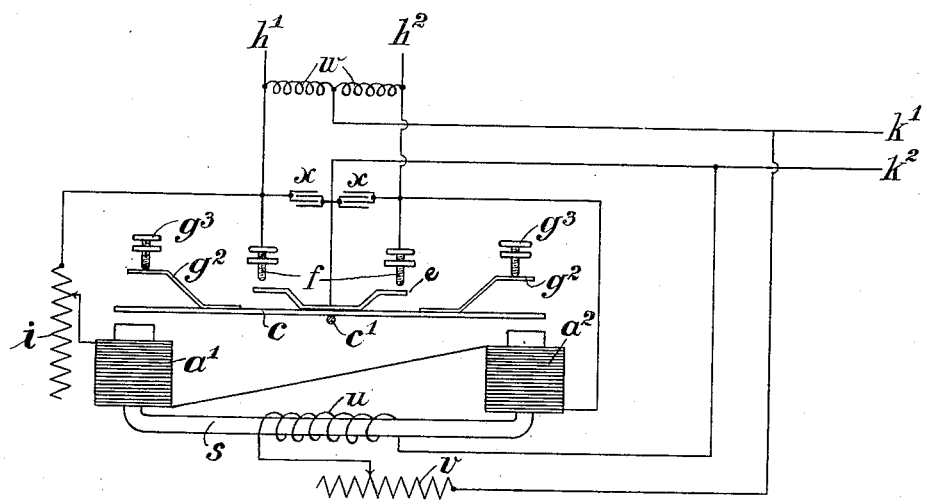
Fig. 3.
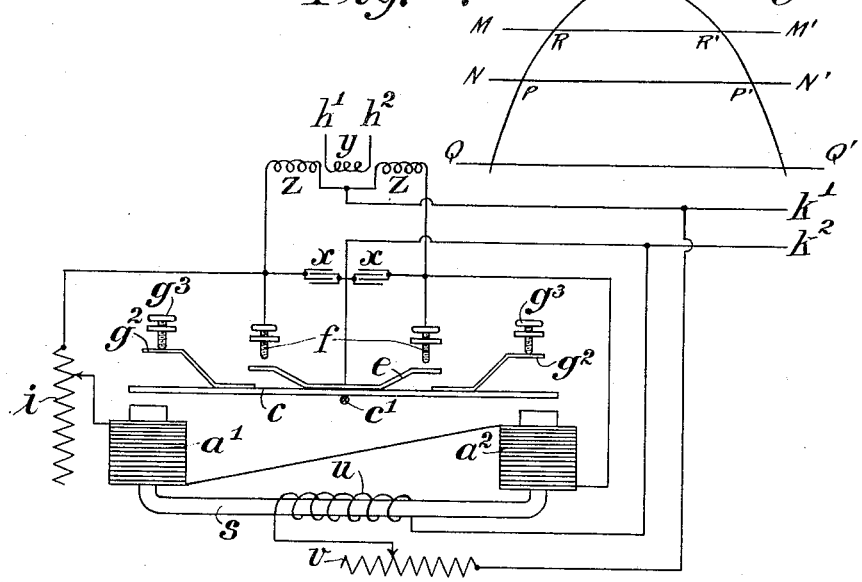
Fig. 4.
Fig. 5.
Witnesses
Inventor
Edgar Giglio

UNITED STATES PATENT OFFICE.

EDGAR GIGLIO, OF LONDON, ENGLAND, ASSIGNOR TO WESTINGHOUSE ELECTRIC & MANUFACTURING COMPANY, A CORPORATION OF PENNSYLVANIA.

RECTIFYING APPARATUS FOR ELECTRIC CURRENTS.

1,184,233. Specification of Letters Patent. Patented May 23, 1916.

Application filed April 25, 1910, Serial No. 557,582. Renewed December 30, 1911. Serial No. 668,766.

*To all whom it may concern:*

Be it known that I, EDGAR GIGLIO, subject of the King of Great Britain, residing at London, in the Kingdom of England, have invented certain new and useful Improvements in Rectifying Apparatus for Electric Currents, of which the following is a specification.

My invention relates to the rectification of alternating electric currents for the purpose of causing waves or impulses of current to be supplied in one direction only to a receiving circuit.

It is the object of my invention to effect current rectification with a minimum expenditure of energy, and by apparatus which will be simple in its operation, inexpensive to manufacture and maintain, and not liable to be readily disturbed or thrown out of order.

According to my invention, alternating electric currents are caused to act in a coil or coils in such manner as to cause a polarized armature to vibrate or oscillate and to thereby so close and open electrical connections to the receiving circuit as to permit current impulses to be fed into the said circuit in one direction only.

In order that the invention may be clearly understood, it has been illustrated in the accompanying drawings, in which—

Figure 1:
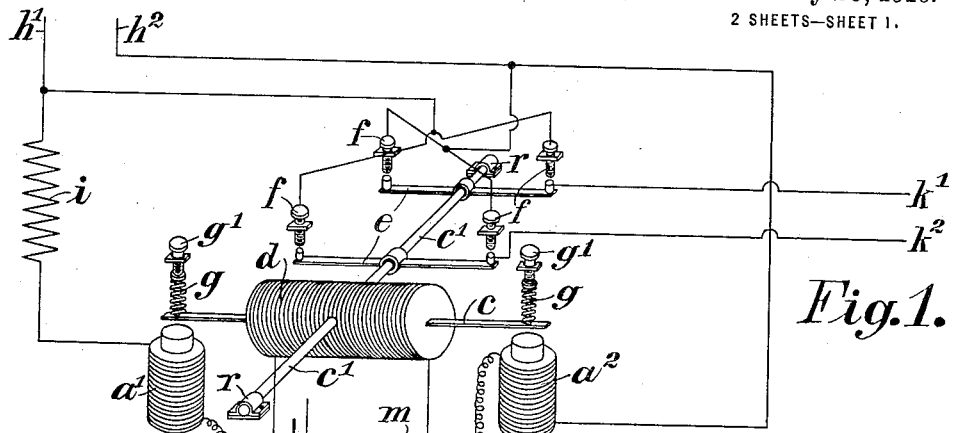
Figure 2:
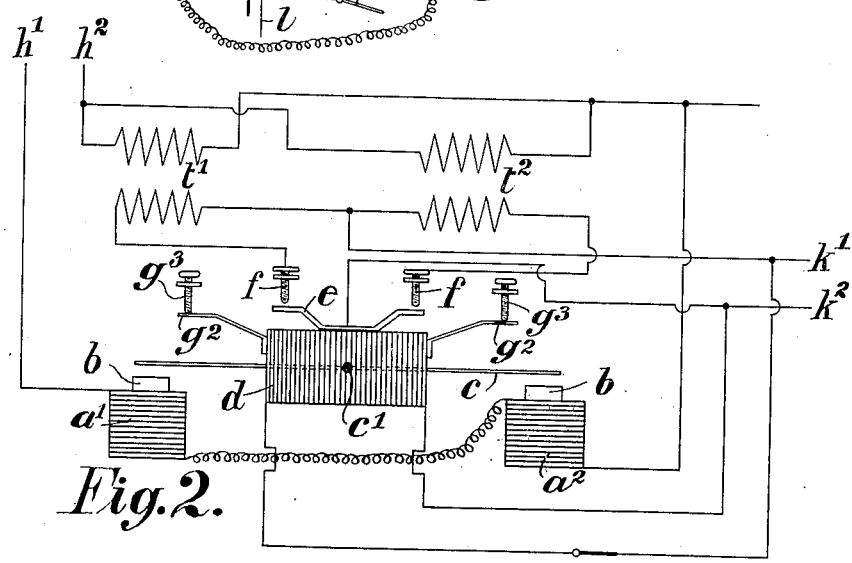

Figure 1 is a diagrammatic perspective view of one form of apparatus embodying my invention; Fig. 2 is a diagrammatic side elevation of a modified apparatus in which a transformer is used in connection with the rectifier; Fig. 3 is a view, similar to Fig. 2, of modified construction in which the rectifier requires no coil on its oscillating armature; Fig. 4 is a view, similar to Fig. 3, in which a two-coil transformer is used in place of an auto-transformer; Fig. 5 is a wave diagram illustrating the operation of my device.

Referring now to Fig. 1, $h'$, $h^2$ are the conductors supplying alternating current to be rectified, and $k'$, $k^2$ are the conductors receiving the rectified current. The coils $a'$, $a^2$ of two electromagnets are connected in series with a suitable resistance $i$ to the supply lines $h'$ and $h^2$. Over the poles $b$ of these electromagnets $a'$, $a^2$ works an armature $c$ pivotally mounted by means of a rocking shaft $c'$ which is supported in suitable bearings $r$. The armature $c$ is surrounded by a coil $d$ excited by continuous current supplied from a suitable source such as an accumulator or a primary battery $l$; a switch $m$ may be included in the circuit. The armature $c$ is acted upon by springs $g$ which may be connected to adjusting screws $g'$ by which the tension of the springs may be varied as required. On the shaft $c'$ are fixed two bars $e$, each of which carries two contact pieces located at opposite sides of the shaft and coöperating with stationary contact pieces or screws $f$. The bars $e$ are insulated from the shaft $c'$ and one of them is connected to one of the conductors $k'$ of the rectified current circuit, while the other bar is connected to the other conductor $k^2$ of said circuit. The conductors $h'$, $h^2$ carrying the alternating currents are each connected, as shown, to one of the contact pieces $f$ of one of the bars $e$, and to the contact piece $f$ of the other bar arranged on the other side of the shaft.

When the switch $m$ is closed, the current from the source $l$ causes the armature $c$ to develop opposite magnetic polarity at its ends, this polarity remaining constant, while the poles $b$ of the coils $a'$, $a^2$ develop alternately north and south polarity as the alternations occur in the current supplied. The armature $c$ is therefore alternately attracted and repelled by one of the poles $b$ while being repelled or attracted by the other so that it is caused to oscillate synchronously with the alternations of the current. At each half period, therefore, the connections between $k'$, $k^2$ and $h'$, $h^2$ are reversed through the bars $e$ and contacts $f$. The circuit $k'$, $k^2$ thus receives a rectified current in which all the half waves of the alternating current are utilized. The breakage of the circuit between the contact pieces of the bars $e$ and the screws $f$ should occur at the periods when the current is just reversing in direction so that no current will be passing at these periods. The adjustment of the springs $g$ will be regulated for this purpose to synchronize the movements of the armature with the pulsations of the alternating current.

Fig. 2 shows a modified construction in which two contact screws $f$ only are required. In this construction, the two screws $f$ which coöperate with the contact pieces $e$ of the rocking armature $c$ are connected to opposite ends of two secondary windings of the transformer $t'$, $t^2$, while the other ends of these windings are connected together, as shown. The primary windings of the transformer are connected in parallel in the alternating current circuit which includes also the conductor $h'$, the windings $a'$, $a^2$, and the conductor $h^2$. One of the conductors $k'$ of the rectified current circuit is connected to the mid-point between the two secondary windings of the transformer $t'$, $t^2$ while the other conductor $k^2$ is connected to the contact pieces $e$. The movements of the armature $c$ in this case are controlled by plate springs $g^2$ fixed to the armature and adapted to work against stationary stops $g^3$ which can be adjusted to allow the movements of the armature to be synchronized with the alternations of the current. The armature $c$ is pivoted at $c'$ as before and carries a coil $d$ excited by continuous current from conductors $k'$, $k^2$ or from a separate source, as indicated in Fig. 1. With this construction, the armature is caused to vibrate, as before, in synchronism with the pulsations of the alternating current, and the secondary windings of the transformer are alternately connected through members $e$ and $f$ on the one hand with the conductor $k^2$, while the mid-point is permanently connected with the conductor $k'$. Hence, at each half wave period a current impulse is fed into the rectified current circuit.

In the modified construction shown in Fig. 3, the coils $a'$, $a^2$ are supplied, as before, with alternating current from the lines $h'$, $h^2$ through an adjustable resistance $i$. The cores of these coils are connected by a yoke piece $s$ which may be a permanent magnet or may be of soft iron continuously magnetized in one direction by a direct current coil. In the figure, $s$ is shown as a permanent magnet, the magnetization of which is maintained or strengthened by a coil $u$ connected to the conductors $k'$, $k^2$, or to a separate source as indicated in Fig. 1 through an adjustable resistance $v$. By adjusting the resistances $i$ and $v$, the relative magnetic effects of the coils $a'$, $a^2$, and the coil $u$, respectively, can be varied as required to enable the apparatus to be adjusted in working. The rocking armature $c$ in this case is of iron having no magnetizing coils. It is provided with springs $g^2$ and adjusting screws $g^3$ corresponding to these parts in Fig. 2, and also with contact pieces $e$ coacting with contact screws $f$.

$w$ is the coil of an auto-transformer connected across the mains $h'$, $h^2$, and having its mid-point connected to one of the rectified current lines $k'$, while the other line $k^2$ is connected to the contact springs $e$ on the rocking armature. To prevent sparking, condensers $x$ are connected across between the contact springs $e$ and each of the conductors from the terminals of the transformer $w$ and the supply lines $h'$, $h^2$ attached to the contact screws $f$.

Fig. 4 is a detail view illustrating the modifications necessary in the connections when an ordinary transformer having a primary coil $y$, and two secondary coils $z$ is used in place of the auto-transformer $w$. The coil $y$ is connected to the supply lines $h'$, $h^2$ while the outer ends of the coils $z$ are connected to the contact screws $f$ and the electromagnets $a'$, $a^2$, and the inner ends are connected together and to the rectified current line $k'$.

With the arrangements of Figs. 3 and 4, the working is substantially the same. The coils $a'$ and $a^2$ have the effect of alternately strengthening and weakening the terminal polarity due to the permanent magnet $s$ so that the armature $c$ is alternately drawn toward the one or the other of the electromagnets. It is adjusted as before to vibrate in synchronism, and reverses the electrical connections for the rectified current circuit so as to cause the line $k^2$ to be alternately connected to one end or the other of the auto-transformer, or one end or the other of the secondary windings of the two-coil transformer. The condensers $x$ are connected across the points where the circuits are made and broken for the purpose of reducing or preventing sparking at the contact points. Condensers similarly connected may, of course, be used with any other of the forms of construction hereinbefore described.

The manner in which the adjustment of the springs $g$ or of the rheostats $i$ and $v$ brings about circuit make and break at points of zero current flow may be readily understood from a consideration of Fig. 5 which represents diagrammatically a voltage wave flowing to a rectifier. The voltage of a storage battery may be represented by an abscissa N—N' at the beginning of charge and by a higher abscissa M—M' at the end of charge. The proper time for closing the circuit between the rectifier and the battery at the outset of the charging period is represented by the point P on the voltage wave. The current which will flow is then zero because the voltages of the rectifier and battery are equal and opposite. In like manner, the proper point in the voltage wave for breaking the circuit without sparking is P'. At the end of charge the proper points for make and break, respectively, are R and R'. It will be noted that the optimum time for closing the circuit grows later as the charge progresses and that the optimum time for breaking grows earlier, also that the length of time in each voltage wave during which the rectifier is connected to the battery should be decreased as the charge progresses.

The duration of current flow from each wave depends upon the length of the period of contact between the contact springs E and their respective fixed contact members. A strong force operating the vibrating armature tends to flex the contact springs E to a relatively great degree and give a long period of contact, suitable for the outset of the charging period. Conversely, a weak force tending to vibrate the armature would result in little flexing of the contact springs and a short period of contact, suitable for the latter portions of the charging period. A weak resultant force for the operation of the contact springs may be provided by strengthening the control springs $g$ or by weakening the actuating force by weakening either the alternating or the direct exciting currents. Accordingly, as a charging period progresses, the amount of resistance in either or both of the rheostats $i$ and $v$ should be increased.

Finally, it will be evident that the various figures of the drawings are intended to serve only as diagrams illustrating some of the possible constructions of the rectifiers according to this invention, and the details of construction and of the electrical connections might be altered in many cases, as will be evident to an electrician, without departing from the scope of the invention.

Having thus described the invention what is claimed as new is:

1. In a rectifier for obtaining unidirectional currents from an alternating current supply, the combination of alternating current supply lines and rectified current lines, a pair of electromagnets and means carrying the alternating current whereby the said electromagnets are energized, an armature and means pivotally supporting the same with its ends adjacent to the poles of the electromagnets, a source of direct current and means for impressing a definite polarity on the magnetic circuit by the said direct current, plate springs acting in opposition to each other attached to the armature and means for exerting adjustable pressure thereon whereby the spring tension opposing the oscillating movements of the armature is made adjustable, a plurality of contact devices in connection with the said pivotally supported armature and connected respectively to said alternating and direct current lines and contacts adapted to be closed and opened thereby as the armature oscillates whereby the connections of the alternating current supply lines are changed in such a manner as to send impulses in one direction only into the rectified current lines.

2. In a rectifier for obtaining unidirectional currents from an alternating current supply, the combination with fixed contact members, of an armature provided with resilient contact members, alternating and direct current flux producing circuits, and adjustable resistances in said circuits to enable the relative value of the alternating and direct current fluxes to be varied according to the operation of the rectifier, whereby to cause the armature contact members to break with the fixed contact members at different voltage values of the wave according to the load.

3. A current-rectifying device comprising adjacent relatively oscillatory magnets, one of which is polarized, means for magnetizing the other of said magnets with an alternating flux, resilient means opposing relative oscillation of the magnets in both directions, two single contact members and a double contact member, said double contact member being caused to engage and disengage said single contact members alternately by the relative oscillation of the magnets.

4. A current-rectifying device comprising adjacent relatively oscillatory magnets, one of which is polarized, means for energizing the other of said magnets with an alternating flux, resilient means opposing relative oscillation of the magnets in both directions, two single contact members and a double contact member, said double contact member being caused to engage the others alternately by the relative oscillation of the magnets.

5. A current-rectifying device comprising adjacent relatively oscillatory magnets, one of which is polarized, means for energizing the other of said magnets with an alternating flux, resilient means opposing relative oscillation of the magnets in both directions, said means being adjustable to effect synchronous operation of the device, and contact members that are caused to engage and disengage alternately by the relative oscillation of the magnets.

6. A current-rectifying device comprising adjacent relatively oscillatory magnets, one of which is polarized, an alternating current magnetizing winding for the other magnet, resilient means opposing relative oscillation of the magnets in both directions, two single contact members, and a double contact member, said double contact member being caused to engage the others alternately by the relative oscillation of the magnets.

7. A current-rectifying device comprising adjacent relatively oscillatory magnets, one of which is polarized, means for energizing the other of said magnets with an alternating flux, plate spring means opposing relative oscillation of the magnets in both directions, two single contact members and a double contact member, said double contact member being caused to engage the others alternately by the relative oscillation of the magnets.

8. A current-rectifying device comprising adjacent relatively oscillatory magnets, one of which is polarized, means for energizing the other of said magnets with an alternating flux, adjustable plate spring means opposing relative oscillation of the magnets in both directions, two single contact members, and a double contact member, said double contact member being caused to engage the others alternately by the relative oscillation of the magnets.

9. A current-rectifying device comprising adjacent relative oscillatory magnets, one of which is polarized, means for energizing the other of said magnets with an alternating flux, plate spring means opposing relative oscillation of the magnets in both directions, and electrical connections that are alternately established and interrupted by the relative oscillation of the magnets.

10. In a current-rectifying system, the combination with a source of alternating current, a transformer connected thereto, and a receiving circuit having one conductor connected to an intermediate point of the secondary of the transformer, of a current-rectifying device comprising adjacent relatively oscillatory magnets one of which is polarized, a winding for the other magnet receiving energy from the source of alternating current, resilient means opposing relative oscillation of the magnets in both directions, two single contact members, and a double contact member, said double contact member being caused to engage the others alternately by the relative oscillation of the magnets and is connected to one conductor of the receiving circuit, and the single contact members being respectively connected to secondary terminals of the transformer.

11. In a current-rectifying system, the combination with a source of alternating current, a transformer connected thereto, and a receiving circuit having one conductor connected to an intermediate point of the secondary winding of the transformer, of a current-rectifying device comprising adjacent relatively oscillatory magnets one of which is polarized, a winding for the other magnet receiving energy from the source of alternating current, two single contact members, and a double contact member, said double contact member being caused to engage the others alternately by the relative oscillation of the magnets and being connected to one conductor of the receiving circuit, and said single contact members being respectively connected to secondary terminals of the transformer.

12. A device for rectifying both half waves of an alternating current comprising adjacent relatively oscillatory magnets, one of which is polarized, means for energizing the other of said magnets with an alternating flux, resilient means opposing relative oscillation of the magnets in both directions, two single contact members, and a double contact member, said double contact member being caused to engage the others alternately by the relative oscillation of the magnets.

13. In a current-rectifying system, the combination with a source of alternating current, and a transformer connected thereto, of a rectifying device supplied from said transformer comprising adjacent relatively oscillatory magnets, one of which is polarized, a winding for the other magnet connected in series with said transformer, and electrical connections between the terminals and an intermediate point of the transformer secondary winding that are alternately established and interrupted by the relative oscillation of the magnets.

14. In a current-rectifying system, the combination with a source of alternating current, a transformer connected thereto, and a receiving circuit having one conductor connected to an intermediate point of the secondary winding of the transformer, of a current-rectifying device comprising adjacent relatively oscillatory magnets, one of which is polarized, a winding for the other magnet receiving energy from the source of alternating current in phase with that traversing the transformer, two single contact members and a double contact member, said double contact member being caused to engage the others alternately by the relative oscillation of the magnets and being connected to one conductor of the receiving circuit, and the two single contact members being connected respectively to secondary terminals of the transformer.

15. The combination with a source of alternating current, of means for deriving therefrom two alternating magnetic fluxes substantially in phase with each other, means for producing a secondary current by one of said fluxes, means for operating a set of rectifying contact members by the other of said fluxes, and a circuit for said secondary current through said contact members, whereby said secondary current may be rectified.

16. The combination with a source of alternating current, of means for deriving therefrom two magnetic fluxes substantially in phase with each other, a secondary winding embracing one of said fluxes, means for operating a set of rectifying contact members by the other of said fluxes, and a circuit connecting the terminals of said secondary winding through said rectifying contact members and a load to substantially the mid point of said secondary winding.

17. The combination with a source of alternating current, of means for deriving therefrom magnetic fluxes substantially in phase with each other, a secondary winding embracing one of said fluxes, a polarized movable armature mounted to be acted upon by the other flux, two contact members carried by said armature and arranged to cooperate respectively with two relatively fixed contact members, a connection from each of said relatively fixed contact members to one of the terminals of said secondary winding, and a connection from said armature through a load circuit to substantially the mid point of said secondary winding.

18. In a vibrating rectifier, the combination with a transformer, of an alternating-current driving magnet, a polarized movable armature therefor, contact members actuated by said armature and movable to make contact with relatively fixed contact members, a load, and a rectifying circuit connecting the secondary winding of said transformer to said load through said contact members, the winding of said alternating-current magnet being connected in series relation with one of the windings of said transformer, whereby the flux in said alternating-current magnet will be substantially in phase with the line current.

19. In a vibrating rectifier, the combination with a transformer, of an alternating-current driving magnet, a polarized movable armature therefor, contact members actuated by said armature and movable to make contact with relatively fixed contact members, a load, and a rectifying circuit connecting the secondary winding of said transformer to said load through said contact members, the winding of said alternating-current magnet being connected in series relation with the primary winding of said transformer, whereby the flux in said alternating-current magnet will be substantially in phase with the line current.

In witness whereof, I have hereunto signed my name this 14th day of April 1910, in the presence of two subscribing witnesses.

EDGAR GIGLIO.

Witnesses:
AIDA DAVIS,
CHARLES HERBERT ROSOMAN.